United States Patent
Han

(10) Patent No.: US 9,768,420 B2
(45) Date of Patent: Sep. 19, 2017

(54) RECHARGEABLE BATTERY

(71) Applicant: SAMSUNG SDI CO., LTD., Yongin-si, Gyeonggi-do (KR)

(72) Inventor: Min-Yeol Han, Yongin-si (KR)

(73) Assignee: SAMSUNG SDI CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/806,853

(22) Filed: Jul. 23, 2015

(65) Prior Publication Data

US 2016/0141564 A1    May 19, 2016

(30) Foreign Application Priority Data

Nov. 13, 2014    (KR) ........................ 10-2014-0158193

(51) Int. Cl.
| | |
|---|---|
| *H01M 2/04* | (2006.01) |
| *H01M 2/02* | (2006.01) |
| *H01M 2/06* | (2006.01) |
| *H01M 10/04* | (2006.01) |
| *H01M 2/26* | (2006.01) |
| *H01M 10/052* | (2010.01) |

(52) U.S. Cl.
CPC ......... *H01M 2/024* (2013.01); *H01M 2/0202* (2013.01); *H01M 2/043* (2013.01); *H01M 2/0404* (2013.01); *H01M 2/06* (2013.01); *H01M 2/263* (2013.01); *H01M 10/0431* (2013.01); *H01M 10/052* (2013.01)

(58) Field of Classification Search
CPC ..... H01M 10/0431; H01M 2002/0205; H01M 2220/20; H01M 2220/30; H01M 2/0202; H01M 2/024; H01M 2/0404; H01M 2/043; H01M 2/06; H01M 2/30; H01M 2/307
See application file for complete search history.

(56) References Cited

U.S. PATENT DOCUMENTS

2007/0154789 A1*   7/2007   Chang ..................... H01M 2/08
                                                                  429/130
2013/0101870 A1*   4/2013   Byun .................... H01M 2/348
                                                                  429/7

FOREIGN PATENT DOCUMENTS

| KR | 10-2000-0038268 A | 7/2000 |
|---|---|---|
| KR | 10-2007-0071240 A | 7/2007 |

* cited by examiner

*Primary Examiner* — Patrick Ryan
*Assistant Examiner* — Ben Lewis
(74) *Attorney, Agent, or Firm* — Lee & Morse P.C.

(57) ABSTRACT

A rechargeable battery includes an electrode assembly having a first electrode and a second electrode of different polarities, a case with an opening that houses the electrode assembly, the case having a pair of opposing first side walls, each first side wall of the pair of first side walls including at least one groove extending from the opening of the case to an opposite side of the case, a cap assembly coupled to the opening of the case to seal the case, a first current collecting member and a second current collecting member inside the case, the first and second current collecting members being connected to the first electrode and the second electrode, respectively, and a first terminal and a second terminal on the cap assembly, the first and second terminals being connected to the first current collecting member and the second current collecting member, respectively.

10 Claims, 7 Drawing Sheets

RECHARGEABLE BATTERY

CROSS-REFERENCE TO RELATED APPLICATION

Korean Patent Application No. 10-2014-0158193, filed on Nov. 13, 2014, in the Korean Intellectual Property Office, and entitled: "Rechargeable Battery," is incorporated by reference herein in its entirety.

BACKGROUND

1. Field

The described technology relates generally to a rechargeable battery.

2. Description of the Related Art

A rechargeable battery can be repeatedly charged and discharged, unlike a primary battery that is incapable of being recharged. A rechargeable battery of a small capacity is used for a small portable electronic device, e.g., a mobile phone, a laptop computer, and a camcorder, and a rechargeable battery of a large capacity is widely used as a power source for driving a motor, e.g., of a hybrid vehicle.

A high power rechargeable battery using a non-aqueous electrolyte of a high energy density has been developed, and in order to use it when driving a motor of a device, e.g., an electric vehicle requiring high power, the high power rechargeable battery is formed as a rechargeable battery of a large capacity by coupling a plurality of rechargeable batteries in series. Such a rechargeable battery houses an electrode assembly that is formed by interposing a separator, which is an insulator, between positive and negative electrode plates, and an electrolyte solution in a case, and the case is sealed with a cap assembly.

SUMMARY

An exemplary embodiment provides a rechargeable battery, including an electrode assembly having a first electrode and a second electrode of different polarities, a case with an opening that houses the electrode assembly, the case having a pair of opposing first side walls, each first side wall of the pair of first side walls including at least one groove extending from the opening of the case to an opposite side of the case, a cap assembly coupled to the opening of the case to seal the case, a first current collecting member and a second current collecting member inside the case, the first and second current collecting members being connected to the first electrode and the second electrode, respectively, and a first terminal and a second terminal on the cap assembly, the first and second terminals being connected to the first current collecting member and the second current collecting member, respectively.

The case may be a cuboid, and a first side wall having the groove may have a larger width than that of a second side wall that connects between a pair of first side walls.

A depth of the groove may be less than half of a thickness of the case.

The electrode assembly may be spiral-wound about a winding axis and be inserted into the case in a direction parallel to the winding axis.

The first electrode and the second electrode may each include an electrode plate and an electrode uncoated region that is protruded from the electrode plate.

The electrode uncoated region may be protruded in a direction of the cap assembly.

The rechargeable battery may further include a current collecting member that has a plate-shaped current collecting plate located between the cap assembly and the electrode assembly, and a current collecting leg that is bent from the current collecting plate to contact the electrode uncoated region.

The grooves in the opposing first side walls may be on internal surfaces of the case.

The grooves in the opposing first side walls may overlap each other.

The grooves may be centered in the opposing first side walls, the grooves extending along an entire height of the case.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
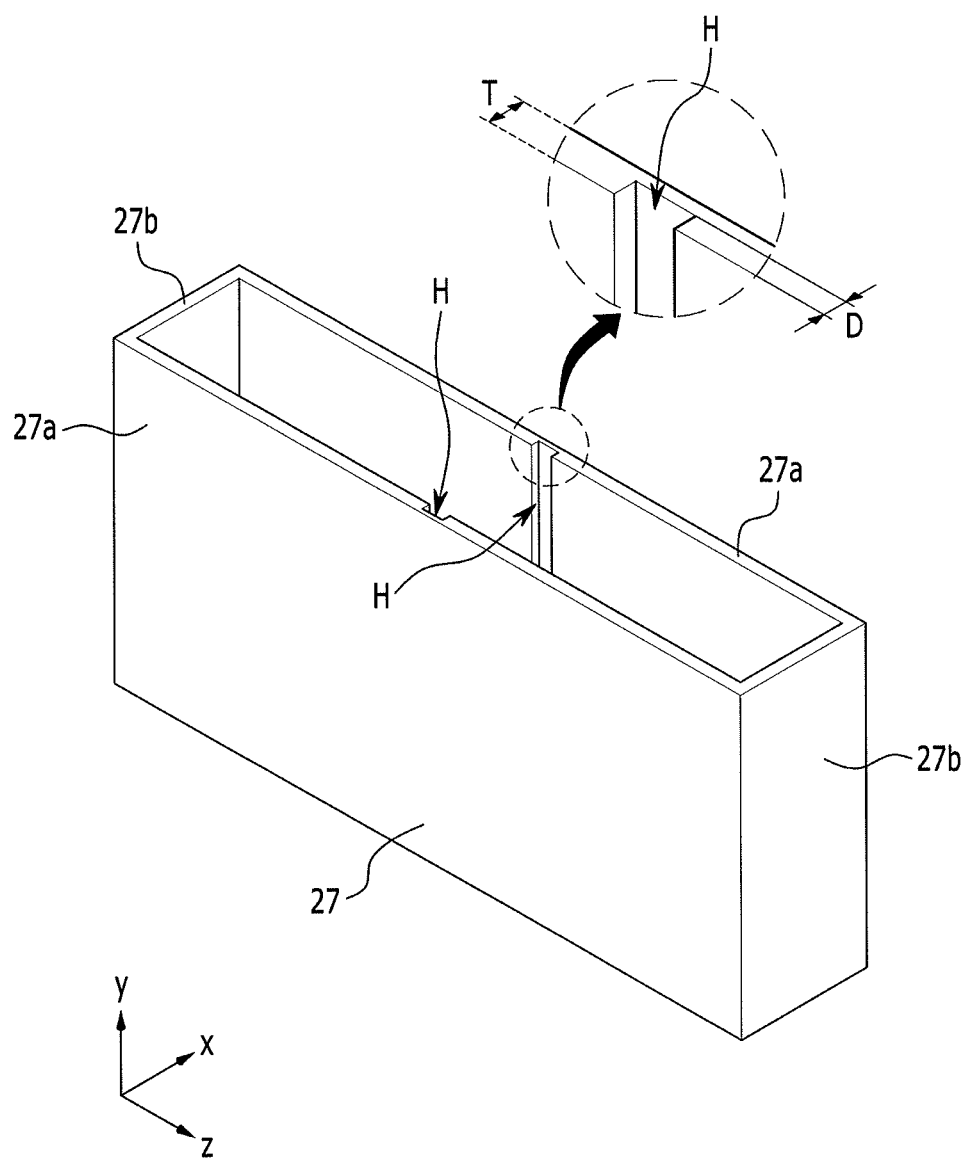
FIG. 1 illustrates a perspective view of a case for a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, in an entire specification, unless explicitly described to the contrary, the word "comprise" and variations such as "comprises" or "comprising" will be understood to imply the inclusion of stated elements but not the exclusion of any other elements. Further, in the specification, "on" indicates on an upper part or a lower part of a target portion, and it does not mean that the target portion is always located at the upper side based on a gravity direction.

Hereinafter, a rechargeable battery according to an exemplary embodiment will be described in detail with reference to the drawings.

FIG. 1 illustrates a perspective view of a case for a rechargeable battery according to an exemplary embodiment.

As shown in FIG. 1, a case 27 for a rechargeable battery according to an exemplary embodiment may be, e.g., a hexahedron having one surface of an opened form. The case 27 may be made of a metal, e.g., aluminum and/or stainless steel.

In detail, the case 27 may be a cuboid with one open surface, and has an internal space in which a battery is inserted, e.g., accommodated. The case 27 of the cuboid shape is described as an example, but the case 27 may have different shapes, e.g., a polyhedral shape or a cylindrical shape, according to a battery shape.

The case 27 is formed with a bottom plate and four side plates that are connected to each side, e.g., edge, of the bottom plate to form e.g., define, the internal space. In each of a pair of opposing side plates, a long groove H is formed from one open side of the case to a bottom plate, which is the other side. In this case, a pair of first side plates 27a having the groove H may have a relatively larger area than that of second side plates 27b connecting between the first side plates. For example, as illustrated in FIG. 1, the grooves H in both first side plates 27a may be symmetrical with respect to axes crossing a center of an interior of the case 27 along the x and z axes.

A depth D of each groove H is less than half of a side wall thickness T, i.e., D<0.5 T. That is, the depth D of each groove H is less than half of a thickness T of the first side plate 27a. When the depth D of the groove H is formed at half or more of the side wall thickness T, strength of the side wall is weakened, and thus, an internal electrode assembly is not sufficiently protected.

Figure 2:
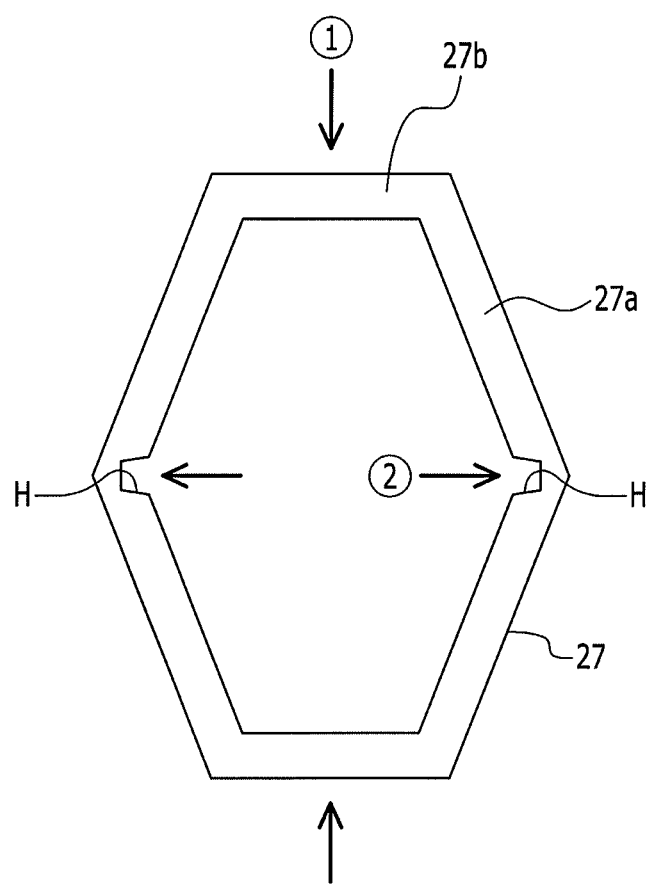
FIG. 2 illustrates a top plan view of deformation of a case according to an exemplary embodiment.

FIG. 2 illustrates a top plan view of deformation of the case 27. As shown in

FIG. 2, when an external pressure is applied in a first direction (arrow ①) to the case 27, in which the groove H is formed, the case 27 is deformed while being pressed.

In detail, because a first portion of the side plate 27a, in which the groove H is formed, has a relatively smaller thickness than other portions of the side plate 27a, the groove H portion is deformed to be bent. Further, because the groove H is formed at the inside of the case 27, when pressure is applied in the first direction, while the case 27 is broken in a second direction (arrow ②), a form of the case 27 is deformed. In other words, when an external pressure is applied, e.g., simultaneously, on both second side plates 27b in the first direction (arrow ①), e.g., when the second side plates 27b are pushed toward each other, the first portions of the side plates 27a with the grooves H are pushed away from each other along the second direction (arrow ②) due to the small thickness thereof, thereby causing deformation of the flat first side plates 27a into bent shapes. That is, a case having a quadrangular top plane shape may be deformed to have a trapezoidal or hexagonal top plane shape, e.g., the case 27 in FIG. 2 is deformed to have a hexagonal shape.

In embodiments, the groove H is formed to enable the groove H portion in the first side plates 27a to be first deformed, e.g., pushed out, when the case 27 is pressed. As such, external impact on the case 27 is directed toward deformation via the grooves H in the first side plates 27a, thereby preventing the case 27 from being irregularly deformed and enabling the deformation to have a constant form.

In the foregoing exemplary embodiment, one groove H is formed in each first side plate 27a. However, embodiments are not limited thereto, e.g., a plurality of grooves may be formed according to a shape and a side plate area to deform.

Hereinafter, a rechargeable battery including the case 27 will be described in detail with reference to FIGS. 3-5.

Figure 3:
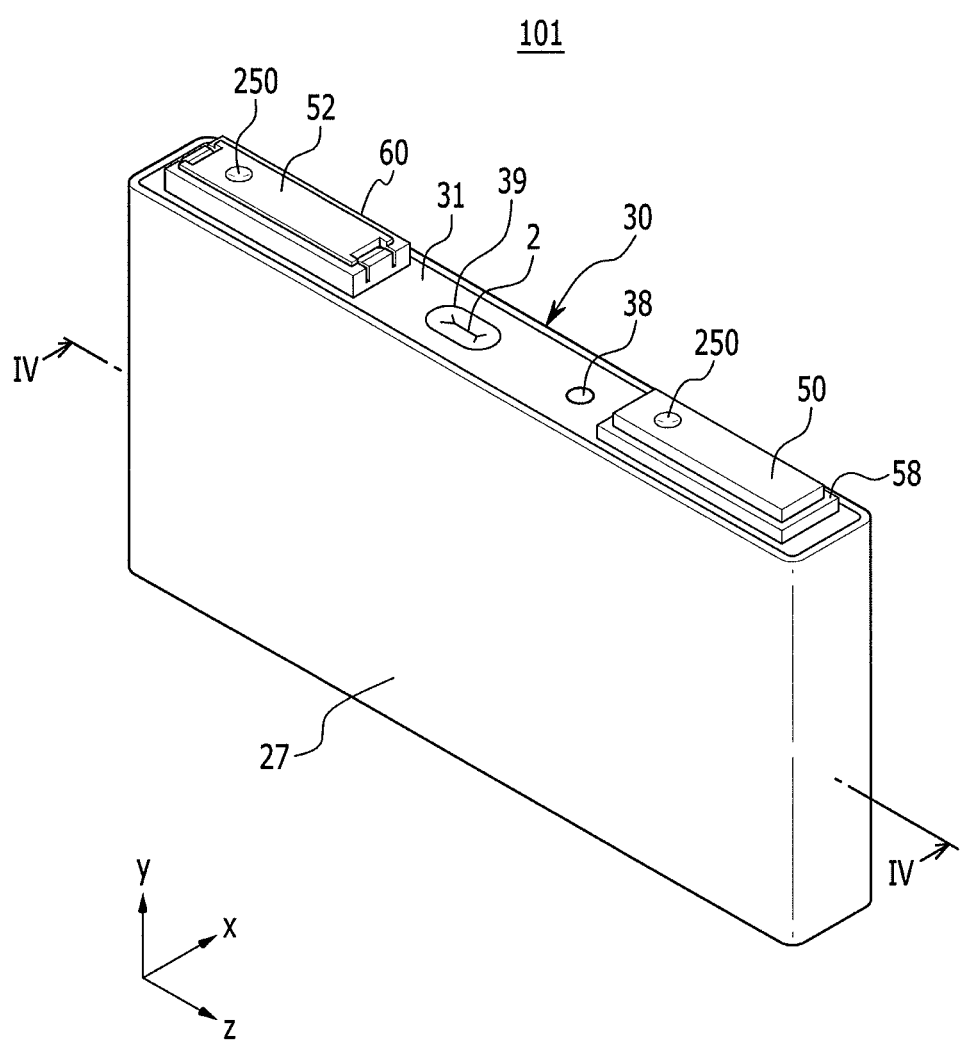
FIG. 3 illustrates a perspective view of a rechargeable battery according to an exemplary embodiment.
Figure 4:
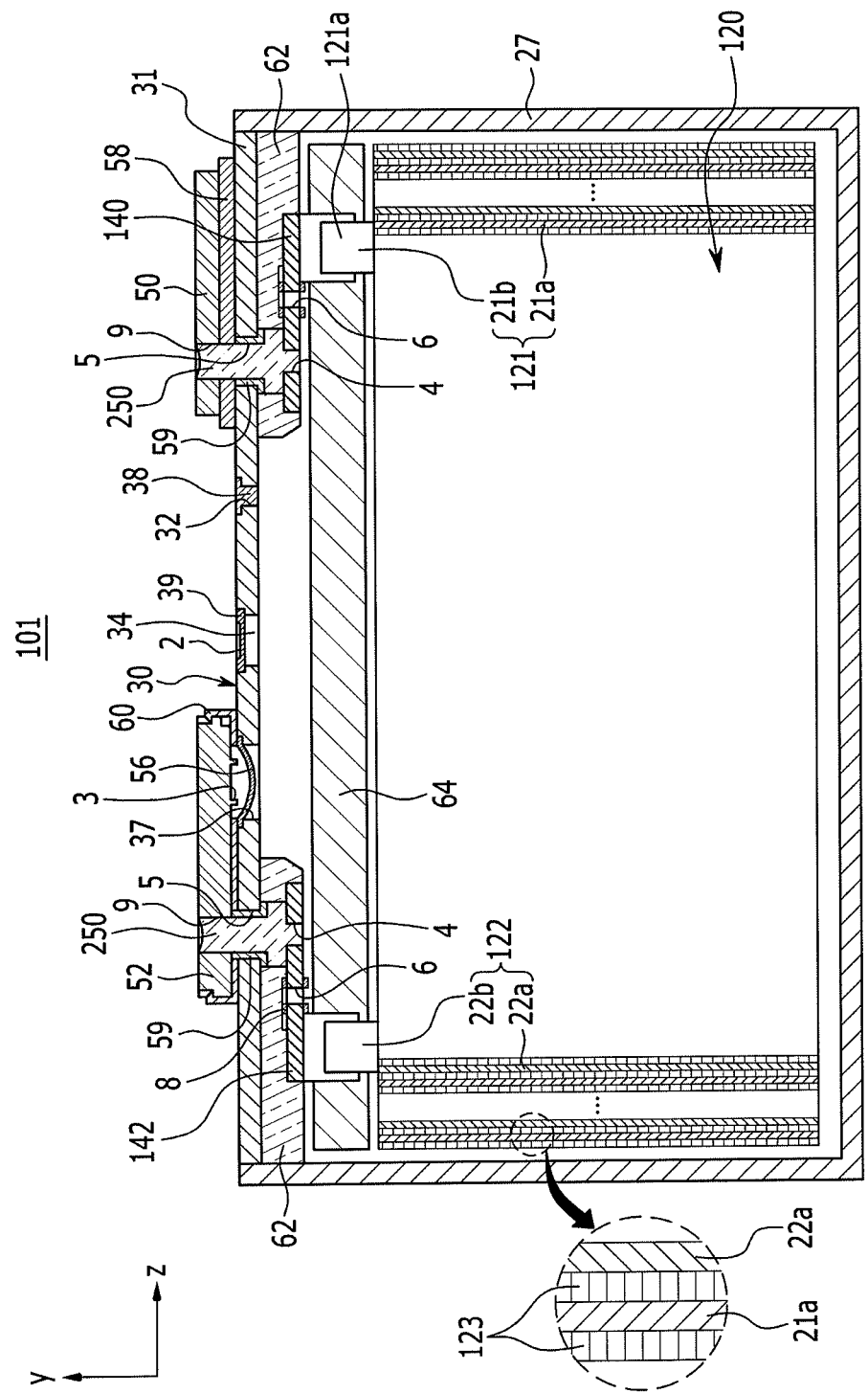
FIG. 4 illustrates a cross-sectional view taken along line IV-IV of FIG. 3.
Figure 5:
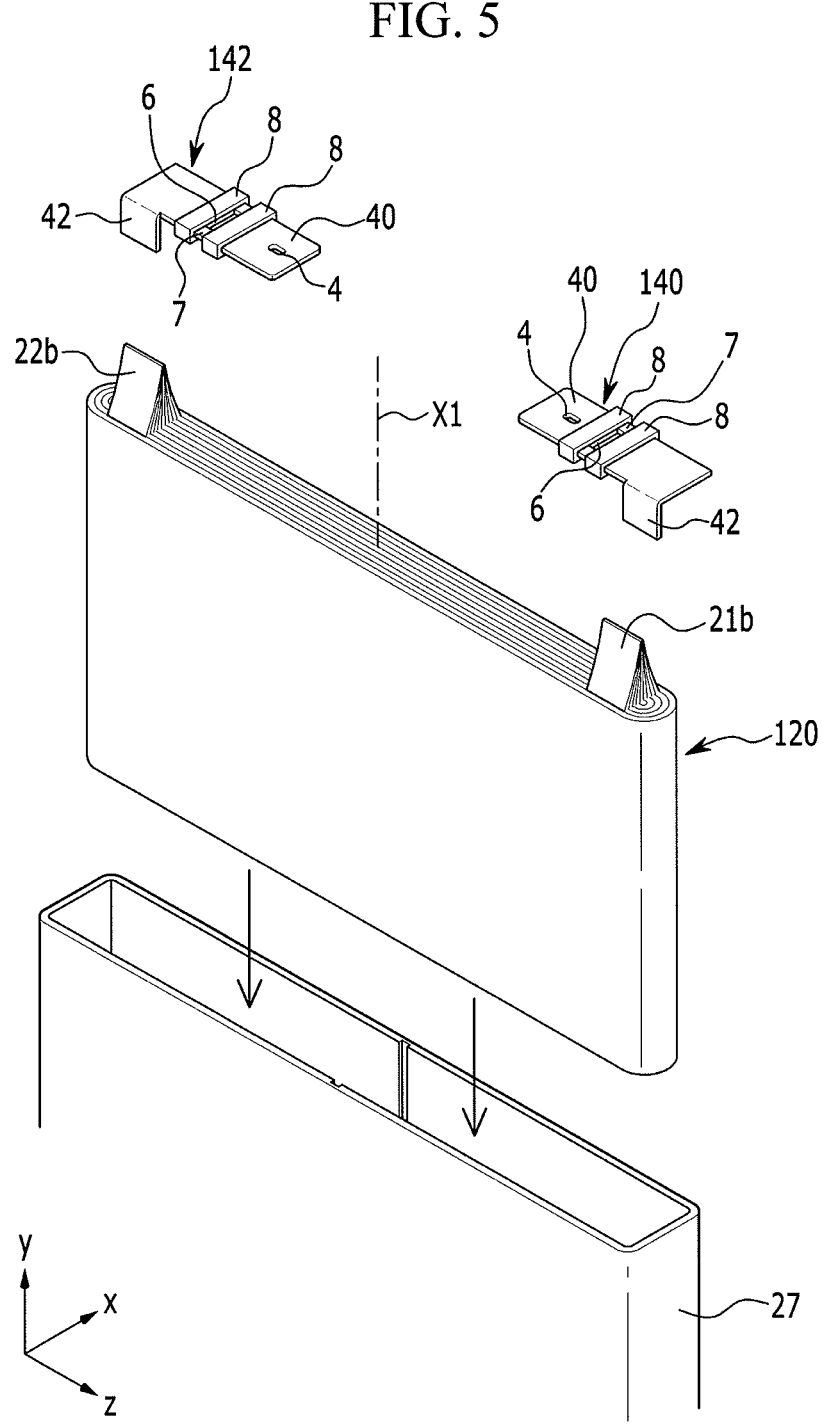
FIG. 5 illustrates a perspective view of an exploded state of a case, an electrode assembly, and a current collecting member of FIG. 3.

FIG. 3 illustrates a perspective view of a rechargeable battery according to an exemplary embodiment, FIG. 4 is a cross-sectional view taken along line IV-IV of FIG. 3, and FIG. 5 is a perspective view of an exploded state of the case 27, an electrode assembly, and a current collecting member of FIG. 3.

As shown in FIGS. 3 and 4, a rechargeable battery 101 according to an exemplary embodiment may include an electrode assembly 120 that is spiral-wound by interposing a separator 123 between a first electrode 121 and a second electrode 122, current collecting members 140 and 142 that are electrically connected to the electrode assembly 120, the case 27 that houses the current collecting members 140 and 142 and the electrode assembly 120, and a cap assembly 30 that is coupled to an opening of the case 27. The rechargeable battery 101 is a lithium ion rechargeable battery, and the rechargeable battery 101 of a square shape is described as an example. However, embodiments are not limited thereto, and can be applied to various forms of batteries, e.g., a lithium polymer battery or a cylindrical battery.

As shown in FIGS. 4 and 5, the electrode assembly 120 is flatly pressed after being spiral-wound about a winding axis X1 with the separator 123 interposed between the first electrode 121 and the second electrode 122. The first electrode 121 and the second electrode 122 include electrode plates 21a and 22a, which are areas where an active material is coated on a thin plate that is formed with a metal foil, and electrode uncoated regions 21b and 22b, respectively, which are areas where an active material is not coated. The first electrode plate 21a may be formed by applying an active material, e.g., a transition metal oxide, to a metal foil, e.g., aluminum, and the second electrode plate 22a may be formed by applying an active material, e.g., graphite or carbon, to a metal foil, e.g., copper or nickel.

The electrode assembly 120 is inserted into the case 27 in a direction parallel to the winding axis X1. Therefore, the first electrode uncoated region 21b and the second electrode uncoated region 22b protrude in a same direction toward the cap assembly 30 at an upper end portion of the electrode assembly 120. The first electrode uncoated region 21b and the second electrode uncoated region 22b are separately disposed at a distance.

The first electrode uncoated region 21b and the second electrode uncoated region 22b are formed by cutting to previously protrude upward when producing the first electrode plate 21a and the second electrode plate 22a, and are thus integrally formed with the first electrode plate 21a and the second electrode plate 22a, respectively. Further, because the first electrode uncoated region 21b and the second electrode uncoated region 22b are formed by spiral-winding or overlapping the first electrode plate 21a and the second electrode plate 22a, respectively, the first electrode uncoated region 21b and the second electrode uncoated region 22b are formed by overlapping a plurality of thin films. In this way, when the first electrode uncoated region 21b and the second electrode uncoated region 22b are formed by overlapping a plurality of thin films, in order to easily move a current, thin films may be connected to contact by ultrasonic welding.

The separator 123 is located between the first electrode plate 21a and the second electrode plate 22a, prevents a short circuit, and performs a function of enabling movement of lithium ions. The separator 123 may be formed with, e.g., a composite film of polyethylene, polypropylene, polyethylene, and polypropylene.

The electrode assembly 120 is substantially received in the case 27 together with an electrolyte solution. The electrolyte solution may be formed with a lithium salt, e.g., $LiPF_6$ or $LiBF_4$, in an organic solvent, e.g., EC, PC, DEC, EMC, and DMC. The electrolyte solution may be in a liquid, solid, or gel state.

The current collecting member includes the first current collecting member 140 and the second current collecting member 142 that are connected to the first electrode uncoated region 21b and the second electrode uncoated region 22b, respectively. The first current collecting member 140 and the second current collecting member 142 have the same shape and thus only the first current collecting member 140 will be described in detail.

The first current collecting member 140 includes a plate-shaped current collecting plate 40 and a current collecting leg 42 that is bent from the current collecting plate 40 to contact an electrode uncoated region. In the current collecting plate 40, a first terminal hole 4 and a fuse hole 6 are formed.

The first terminal hole 4 is a hole through which a connection terminal 250 that is connected to a first terminal 50 outside the cap assembly 30 is inserted to move current. The first terminal hole 4 may have a same shape, e.g., a circular shape, as a transverse cross-section of the connection terminal 250.

The fuse hole 6 may be a slit that crosses the first current collecting member 140 in a width direction, e.g., along the x-axis, and a portion that is removed by the fuse hole 6 and that remains at both sides of the fuse hole 6 becomes a fuse 7. In other words, as illustrated in FIG. 5, the fuse 7 includes two portions spaced apart from each other along the x-axis, so the fuse hole 6 extends between the two portions of the fuse 7 along the x-axis. The fuse 7 that is formed, e.g., defined, by the slit-shaped fuse hole 6 that is formed in the first current collecting member 140 has a narrow width, and thus when a temperature rises to a predetermined temperature or more, the fuse 7 is melted and disconnected. Therefore, in the rechargeable battery, when heat occurs due to an erroneous operation, the fuse 7 is disconnected to prevent the rechargeable battery from being additionally heated, thereby preventing the battery from exploding due to heat.

A pair of block members 8 is installed at both sides of the fuse hole 6, e.g., the fuse hole 6 may be between two block members 8 along the z-axis. The block member 8 is installed to enclose the current collecting plate 40, and may be fixedly installed in the current collecting plate 40. A first block member 8 of the pair of block members 8 is located between the connection terminal 250 and the fuse 7 (along the z-axis in FIGS. 4-5), and a second block member 8 of the pair of block members 8 is located between the fuse 7 and the current collecting leg 42 (along the z-axis in FIG. 5).

The block member 8 is formed of an insulator and performs a function of blocking an arc. For example, the block member 8 may be made of polyimide or a heat resisting resin, e.g., Teflon®. For example, as illustrated in FIG. 5, the block members 8 extend in the x-axis along an entire width of the current collecting plate 40, and an upper end of the block member 8 contacts a second insulating member 62 (FIG. 4).

Referring again to FIG. 4, the cap assembly 30 may include a cap plate 31 that covers the opening of the case 27, the first terminal 50 that protrudes to the outside of the cap plate 31 and that is electrically connected to the first electrode 121, and a second terminal 52 that protrudes to the outside of the cap plate 31 and that is electrically connected to the second electrode 122.

The cap plate 31 is formed in a long plate form that is connected in one direction and is coupled to the opening of the case 27. The cap plate 31 may be made of the same material as that of the case 27, and may be coupled to the case 27 with a laser welding method. Therefore, the cap plate 31 may have the same polarity as that of the case 27.

The cap plate 31 has an electrolyte injection opening 32 for injecting an electrolyte solution, and a second terminal hole 5 for inserting the connection terminal 250. A vent plate 39 having a notch 2 to be opened at a predetermined pressure is installed in a vent hole 34. A seal stopper 38 is installed in the electrolyte injection opening 32, and the connection terminal 250 is inserted into the second terminal hole 5.

The first terminal 50 and the second terminal 52 are formed on, e.g., an external surface of the cap plate 31. The first terminal 50 is electrically connected to the first electrode 121 through the first current collecting member 140, and the second terminal 52 is electrically connected to the second electrode 122 through the second current collecting member 142. However, embodiments are not limited thereto, and the first terminal 50 may be electrically connected to a second electrode and the second terminal 52 may be electrically connected to a first electrode.

The first terminal 50 is formed in a rectangular plate shape. The first terminal 50 includes the connection terminal 250, which is inserted into, e.g., through, the first terminal hole 4 and the second terminal hole 5, as well as a third terminal hole 9 of the first terminal 50, to be electrically connected to the first electrode 121 through the connection terminal 250 that is bonded with the first current collecting member 140.

The connection terminal 250 is formed in a pillar shape and is fixed to the first terminal 50 by welding in a state in which an upper end portion is inserted into the third terminal hole 9. Further, the lower end of the connection terminal 250 is fixed to the first current collecting member 140 by welding in a state that it is inserted into the first terminal hole 4. Therefore, the first electrode 121 is electrically connected to the first terminal 50 through the first current collecting member 140 and the connection terminal 250. A sealing gasket 59 is installed in the second terminal hole 5 to seal between the connection terminal 250 and the cap plate 31.

The second terminal 52 is electrically connected to the second electrode 122 through the connection terminal 250 and the second current collecting member 142 that are inserted into the first to third terminal holes 4, 5, and 9, as in the first terminal 50.

A connection member 58 is formed between the first terminal 50 and the cap plate 31, and a first insulating member 60 is formed between the second terminal 52 and the cap plate 31. Therefore, the case 27 and the cap plate 31 are electrically connected to the first terminal 50 through the connection member 58 and are, thus, electrified with the same polarity as that of the first electrode 121. The second terminal 52 is insulated from the cap plate 31 by the first insulating member 60.

A short circuit protrusion 3 that is protruding toward a short circuit hole 37 in the cap plate 31 is formed in a lower portion of the second terminal 52. The second terminal 52 is extended in one direction, i.e., along the z-axis, to cover the short circuit hole 37. Therefore, the first insulating member 60 may be installed along the second terminal 52, and may be formed to enclose a side surface of the second terminal 52. In FIGS. 3 and 4, lengths of the first terminal 50 and the second terminal 52 are differently shown, but the first terminal 50 may have the same length as that of the second terminal 52.

A short circuit member 56 that is connected to a side wall of the short circuit hole 37 and that short-circuits the first electrode 121 and the second electrode 122 is installed in the short circuit hole 37 of the cap plate 31. The short circuit member 56 includes a curved portion that is curved in a convex arc shape toward the electrode assembly 120 and a circumferential edge portion that is formed at the winding side of the curved portion and that is fixed to a side wall of the short circuit hole 37.

In the interior of the rechargeable battery, when gas occurs due to an abnormal reaction, internal pressure of the rechargeable battery rises. When the internal pressure of the rechargeable battery becomes higher than a predetermined pressure, the curved portion of the short circuit member 56 is pushed upward to become convex in a direction of the second terminal 52, thereby contacting the short circuit protrusion 3 of the second terminal 52 to cause a short circuit. In this way, when a short circuit occurs, a battery reaction no longer occurs, and thus, explosion due to increase of internal pressure may be prevented from occurring. Further, due to a short circuit current of a high current instantaneously occurring upon short-circuiting, the fuse 7 is melted, thereby a short circuit current may be prevented from flowing into the case 27.

The second insulating member 62 is formed between the cap plate 31 and each of the first current collecting member 140 and second current collecting member 142, and a third insulating member 64 is formed between the first current collecting member 140 and second current collecting member 142 and the electrode assembly 120. The second insulating member 62 and the third insulating member 64 may support the first current collecting member 140 and the second current collecting member 142 as well as insulate them.

Figure 6:
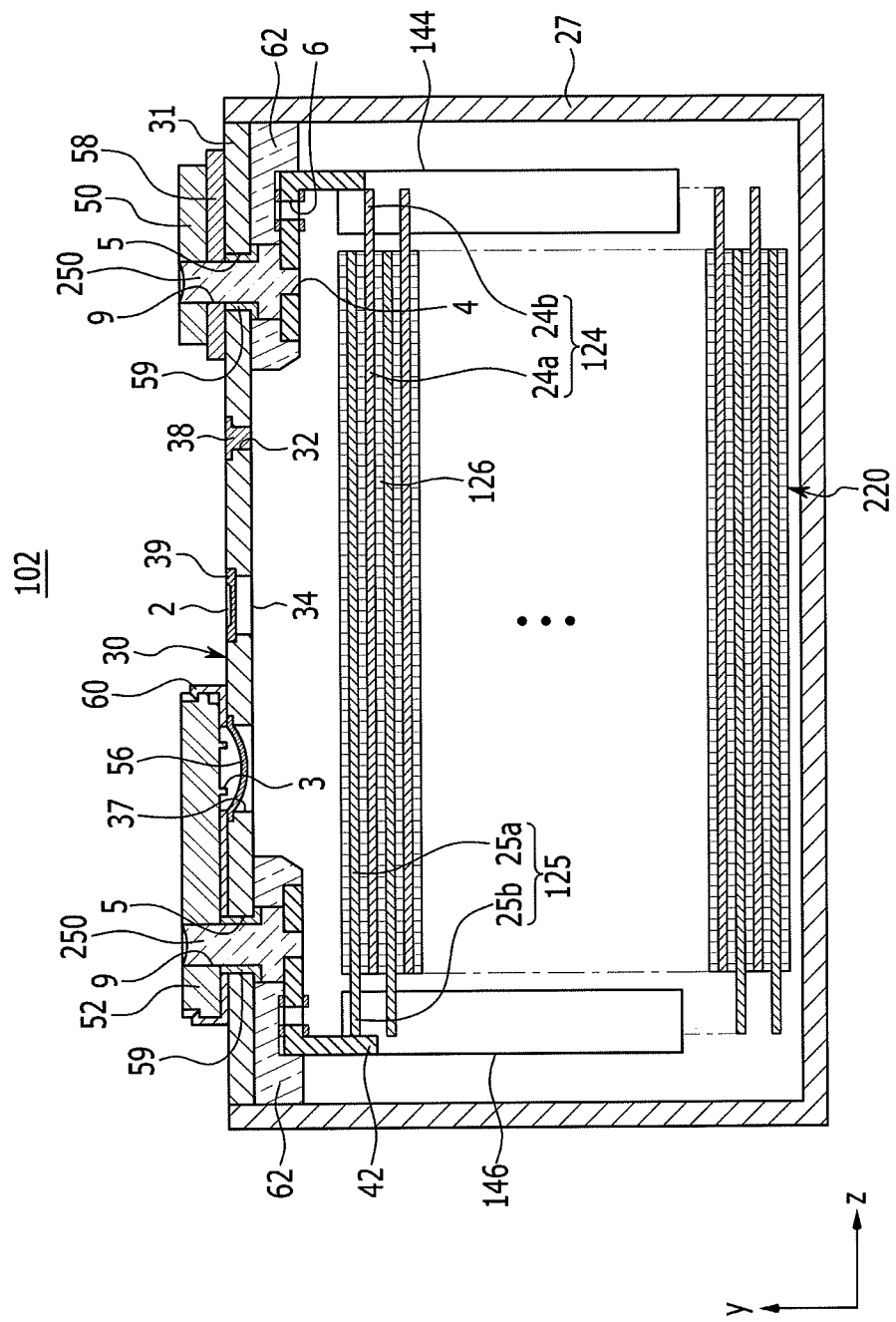
FIG. 6 illustrates a cross-sectional view of a rechargeable battery according to another exemplary embodiment.
Figure 7:
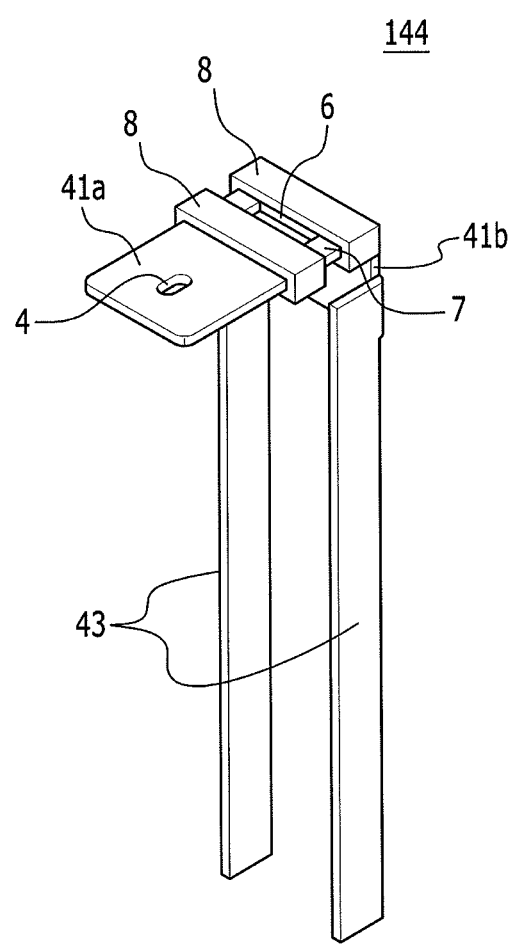
FIG. 7 illustrates a perspective view of a current collecting member of FIG. 6.

FIG. 6 illustrates a cross-sectional view of a rechargeable battery according to another exemplary embodiment, and is a cross-sectional view taken along line IV-IV of FIG. 3. FIG. 7 is a perspective view of a current collecting member of FIG. 6. The rechargeable battery of FIGS. 6 and 7 is similar to that of FIG. 4, and thus only different portions will be described in detail.

As shown in FIGS. 6 and 7, a rechargeable battery 102 according to the current exemplary embodiment may include a first electrode 124 and a second electrode 125 that are spiral-wound with a separator 126 interposed therebetween to form an electrode assembly 220, a case 27 that houses the electrode assembly, and the cap assembly 30 that is coupled to the opening of the case 27.

The first electrode 124 and the second electrode 125 include electrode plates 24a and 25a, which are areas where an active material is coated on a current collector that is formed with a metal foil of a thin plate, and electrode uncoated regions 24b and 25b, respectively, which are areas where an active material is not coated. The first electrode uncoated region 24b is formed at the side end of one side of the first electrode plate 24a in a length direction of the first electrode plate 24a, and the second electrode uncoated region 25b is formed at the side end of the other side of the second electrode plate 25a in a length direction of the second electrode plate 25a. The first electrode plate 24a and the second electrode plate 25a interpose the separator 126 which is an insulator therebetween, and are spiral-wound. However, embodiments are not limited thereto, e.g., the electrode assembly may be formed in a layered structure with the separator 126 interposed between the first electrode plate 24a and the second electrode plate 25a that are formed with a plurality of sheets.

The first terminal 50 is electrically connected to the first electrode 124 through a first current collecting member 144. and the second terminal 52 is electrically connected to the second electrode 125 through a second current collecting member 146. The first current collecting member 144 and the second current collecting member 146 are the same, and thus the first current collecting member 144 is described, and a description of the second current collecting member 146 is omitted.

Referring to FIG. 7, the first current collecting member 144 includes an upper plate 41a that is connected to the connection terminal 250, a side plate 41b that is bent from the upper plate 41a to be connected downward toward the electrode assembly, and two current collecting pieces 43 that are connected to the side plate 41b to be bonded with the electrode assembly.

The upper plate 41a is bent from an end portion of one side thereof to a lower portion toward a bottom plate of the case 27. The two current collecting pieces 43 are bent at both side ends of the side plate 41b and are bonded by welding in a state that they are disposed parallel to the first electrode uncoated region 24b. Accordingly, the current collecting piece 43 is electrically connected to the first electrode 124. Two electrode assemblies may be disposed within the case 27, and each current collecting piece 43 is bonded with the first electrode uncoated region 24b of a different, e.g., other, electrode assembly. Therefore, charges that are generated in the electrode assembly are transferred to the first terminal 50 through the first current collecting member 144 and the connection terminal 250.

The slit 6 is formed in the upper plate 41a, and the fuse 7 having a smaller cross-sectional area than that of a periphery is formed at both sides of the slit 6. The pair of block members 8 are installed in the first current collecting member 144. e.g., the pair of block members 8 may be separately disposed with the fuse 7 and the slit 6 interposed therebetween.

By way of summation and review, when an external impact is applied to a rechargeable battery, an insulator or an electrode assembly may be damaged by a current collecting member or a tab inside of the battery. When the insulator or the electrode assembly is damaged, overheating or an explosion may occur.

Thus, embodiments provide a rechargeable battery having a case with grooves in sidewalls thereof, thereby providing predetermined and constant, e.g., symmetrical, deformation of the case via the grooves upon impact. That is, even when an impact is applied to a rechargeable battery of an exemplary embodiment, the case is deformed along the grooves, thereby avoiding or minimizing contact with, e.g., a current collecting member. As such, an insulator or an electrode assembly is not damaged by pressing of the current collecting member. Therefore, a rechargeable battery does not explode due to damage to the insulator or the electrode assembly and thus a safe rechargeable battery can be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A rechargeable battery, comprising:
an electrode assembly having a first electrode and a second electrode of different polarities;
a case with an opening that houses the electrode assembly, the case having a pair of opposing first side walls, each first side wall of the pair of opposing first side walls including at least one groove, such that the case includes at least two grooves, each groove extending from the opening of the case to an opposite side of the case;
a cap assembly coupled to the opening of the case to seal the case;
a first current collecting member and a second current collecting member inside the case, the first and second current collecting members being connected to the first electrode and the second electrode, respectively; and
a first terminal and a second terminal on the cap assembly, the first and second terminals being connected to the first current collecting member and the second current collecting member, respectively, wherein
the pair of opposing first side walls have widths larger than those of second side walls coupled to the pair of opposing first side walls, and wherein
the at least two grooves are only on the pair of opposing first side walls such that when external impact is applied to the case, the case is deformed in a constant direction.

2. The rechargeable battery as claimed in claim 1, wherein the case is a cuboid.

3. The rechargeable battery as claimed in claim 1, wherein a depth of the at least one groove is less than half of a thickness of at least one first side wall of the pair of opposing first side walls.

4. The rechargeable battery as claimed in claim 1, wherein the electrode assembly has a spiral-wound structure about a winding axis, the electrode assembly being inserted into the case in a direction parallel to the winding axis.

5. The rechargeable battery as claimed in claim 4, wherein each of the first electrode and the second electrode includes an electrode plate and an electrode uncoated region that protrudes from the electrode plate.

6. The rechargeable battery as claimed in claim 5, wherein the electrode uncoated region protrudes in a direction toward the cap assembly.

7. The rechargeable battery as claimed in claim 6, wherein each of the first and second current collecting members includes:
a plate-shaped current collecting plate between the cap assembly and the electrode assembly; and
a current collecting leg bent from the current collecting plate to contact the electrode uncoated region.

8. The rechargeable battery as claimed in claim 1, wherein the at least two grooves in the pair of opposing first side walls are on internal surfaces of the case.

9. The rechargeable battery as claimed in claim 1, wherein the at least two grooves in the pair of opposing first side walls overlap each other.

10. The rechargeable battery as claimed in claim 1, wherein the at least two grooves are centered in the pair of opposing first side walls, the at least two grooves extending along an entire height of the case.

* * * * *